US012704105B2

(12) United States Patent
Herrera

(10) Patent No.: US 12,704,105 B2
(45) Date of Patent: Aug. 11, 2026

(54) HORIZONTALLY-ORIENTED CONICAL-HELICAL HYDROKINETIC TURBINE

(71) Applicant: HATCH TANK LLC, Helotes, TX (US)

(72) Inventor: Matthis Herrera, Helotes, TX (US)

( * ) Notice: Subject to any disclaimer, the term of this patent is extended or adjusted under 35 U.S.C. 154(b) by 57 days.

(21) Appl. No.: 19/204,278

(22) Filed: May 9, 2025

(65) Prior Publication Data

US 2025/0341197 A1 Nov. 6, 2025

Related U.S. Application Data

(63) Continuation of application No. PCT/US2025/027647, filed on May 3, 2025.

(60) Provisional application No. 63/642,761, filed on May 4, 2024.

(51) Int. Cl.
*F03B 3/12* (2006.01)

(52) U.S. Cl.
CPC .......... *F03B 3/121* (2013.01); *F05B 2250/25* (2013.01)

(58) Field of Classification Search
CPC .............................. F03B 3/121; F05B 2250/25
USPC ...................................................... 290/43, 54
See application file for complete search history.

(56) References Cited

U.S. PATENT DOCUMENTS

| | | | | |
|---|---|---|---|---|
| 1,123,491 | A * | 1/1915 | Corbin | F03B 17/061 415/121.2 |
| 2,501,696 | A | 3/1950 | Kmentt | |
| 3,209,156 | A * | 9/1965 | Struble, Jr. | H02K 7/1823 310/156.32 |
| 3,986,787 | A | 10/1976 | Mouton et al. | |
| 4,383,182 | A | 5/1983 | Bowley | |
| 6,126,385 | A * | 10/2000 | Lamont | F03D 1/025 415/214.1 |
| 6,531,788 | B2 | 3/2003 | Robson | |
| 6,806,586 | B2 | 10/2004 | Wobben | |
| 8,376,699 | B1 * | 2/2013 | Hallett | F03B 17/061 415/906 |
| 8,633,609 | B2 | 1/2014 | Cornelius et al. | |
| 9,073,733 | B2 | 7/2015 | Blaxland et al. | |
| 11,879,424 | B2 | 1/2024 | Schurtenberger | |
| 2004/0070210 | A1 | 4/2004 | Johansen et al. | |
| 2005/0285407 | A1 | 12/2005 | Davis et al. | |
| 2011/0089702 | A1 * | 4/2011 | Boren | F03B 17/063 290/55 |
| 2012/0169057 | A1 * | 7/2012 | Tonkin | F03B 17/061 290/54 |
| 2013/0043685 | A1 | 2/2013 | Sireli et al. | |

FOREIGN PATENT DOCUMENTS

WO WO-2008060147 A2 * 5/2008 ........... F03D 1/0633

* cited by examiner

*Primary Examiner* — Charles Reid, Jr.

(57) ABSTRACT

A fully-submerged multi-stage Horizontally-oriented Conical-helical Hydrokinetic Turbine that captures water stream flows (river, tidal, deep ocean currents) and funnels this kinetic-rich concentrated flow into a conical turbine system consisting of a rotating arrangement of helical hydrofoil blades wherein the internal stream is forced to exit out through the frustum turbine blade assembly. With a higher Capacity Factor and Power Coefficient than conventional renewables, this turbine is designed to be an environmentally friendly baseload electricity generator to meet the ever-increasing electricity demands.

17 Claims, 2 Drawing Sheets

HORIZONTALLY-ORIENTED CONICAL-HELICAL HYDROKINETIC TURBINE

CROSS-REFERENCE TO RELATED APPLICATIONS

This application is a bypass continuation of PCT/US25/27647, filed on May 3, 2025, which claims the priority benefit, under 35 U.S.C. 119 (e), of U.S. Provisional Patent Application No. 63/642,761, filed on May 4, 2024, which is incorporated herein by reference in its entirety for all purposes.

BACKGROUND

(1) Field of the Invention

The present invention relates to the field of fully-submersible in-stream turbine generators that can be strategically placed in suitable areas in order to generate dependable renewable baseload and peak load electricity.

(2) Description of Related Art

The demand for mass-deployable, decentralized, non-intrusive baseload renewable electricity generation systems is greater than ever. The identified problems outlined in this document illustrate the alarmingly high projected future demand for such systems and how traditional renewables are not poised to be the best enduring solutions due to several factors, most notably their extremely low electricity generating dependability, also known as the Capacity Factor (Cf). For a renewable electricity generation source to be viable as a fossil fuel baseload replacement, it must not only have sufficient generation capacity, but it must also have a competitive 24/7/365 reliability as measured by the source's Cf rating (%).

The accelerating electrification revolution is compounding problems already present in our energy generation, transmission, and distribution systems. According to Lawrence Berkeley National Laboratory projections[1], the projected electricity demand impact of electrification in the transportation, residential, commercial, and industrial sectors, without factoring in the impact of emerging blockchain and artificial intelligence industries, is anticipated to increase at an accelerated rate through 2050 to nearly 175% of today's demand. This projected increase, coupled with existing supply struggles of our grids, requires us to design and engineer new viable distributed electricity generation alternatives. These new and enhanced generation systems must enable greater energy mix diversification and resilience, while accelerating our necessary break away from fossil fuels.

[1] N. Abhyankar, P. Mohanty, A. Phadke, and Lawrence Berkeley National Laboratory, "Illustrative strategies for the United States to achieve 50% emissions reduction by 2030," 2021.

Compounding the electricity demand problems our grids are facing is the fact that our most reliable (highest Cf) and economically viable (lowest true Levelized Cost of Energy (LCOE)) power plants are time-tested coal- and natural gas-fired. The Center for Sustainable Systems at the University of Michigan predicts that the US will fail to achieve the necessary increase in production while reducing CO2-emitting power production with current technologies. They go so far as to say, "by current DOE estimates, 76% of U.S. energy will come from fossil fuels in 2050, which is widely inconsistent with Intergovernmental Panel on Climate Change (IPCC) carbon reduction goals."[2]

[2] "U.S. energy System Factsheet," *Centerfor Sustainable Systems*. https://css.umich.edu/publications/factsheets/energy/us-energy-system-factsheet Solar and wind power, the two most popular renewable energy sources, have critical flaws that render them unsuitable as baseload power plants. Their energy is generated from unreliable and inconsistent energy sources. This intermittency and variability over both spatial and temporal scales translates to low Cf, mean they are non-contributing energy mix assets when the sun isn't shining (e.g., nighttime, cloudy days) and the wind isn't blowing. Thus, solar and wind generation are unable to consistently match up with consumer demand and behavior; as such, our energy-hungry society cannot rely solely on them as primary energy sources (baseload).

In contrast to periods of low or no electricity generation, solar and wind production exceeding grid capacity can also have significant consequences. When production exceeds demand, renewables are often the first to be cut from the electricity supply, losing clean energy production capacity through grid-controlled curtailment operations. The Electric Reliability Council of Texas (ERCOT) and California Independent System Operator (CAISO) both "curtailed about a fifth of their solar generation in March and April of 2022." Southwest Power Pool (SPP) "curtailed an average of 10% of its total wind generation in 2022, up from 7% in 2021".[3] As such, "Connecting renewable energy sources (RES) with the grid is not as simple as it may seem, and their effectiveness is entirely dependent on weather conditions. From this point of view, RES are considered an unstable energy source, and their operation, without an advanced management system, can cause a serious grid imbalance."[4]

[3] "Wind and solar curtailments on the rise|*BTU Analytics*," BTUAnalytics, Feb. 21, 2023. https://btuanalytics.com/power-and-renewables/wind-and-solar-curtailments-on-the-rise

[4] 7 major challenges of a power grid and their solutions. (n.d.). FUERGY. https://fuergy.com/blog/7-problems-and-challenges-of-a-power-grid Additionally, with a growing dependency on solar and wind energy, there is an increasing need for gas-fired Peaker plants. While these 1,000+US contingency power plants ensure little to no loss in electricity service during times of zero/reduced solar and wind, due to them being in operation less than 4% of the time on average, they "account for a significant portion of systemwide energy costs."[5] Comparing Utility Solar ($24-$96/MWh) and Onshore Wind ($24-$75/MWh) vs Gas Peaking ($115-$221/MWh) Levelized Cost of Energy (LCOE), the per MWh output cost of Peaker plants are 3-4 times the electricity sources they supplement.[6]

[5] Clean Energy Group, "Phase out Peakers—Clean Energy Group," *Clean Energy Group*, Apr. 9, 2024. https://www.cleanegroup.org/ceg-projects/phase-out-peakers

[6] Lazard, "Lazard's Levelized Cost of Energy Analysis-Version 16.0," 2023. [Online]. Available: https://www.lazard.com/media/typdgxmm/lazards-lcoeplus-april-2023.pdf While the inventor acknowledges and supports energy storage as a meaningful component of the solar and wind solution, it presents its own economic and supply chain problems. The per MWh Levelized Cost of grid-level energy storage ($154-$205/MWh)[5] is approximately seven times that of grid-level solar. So, every MWh of storage added to the grid to compensate for the variability and reliability issues of solar and wind adds a significant storage premium to the cost of those renewables they support.

While traditional hydroelectric power plants, with adequate feeder water volumes, don't suffer from intermittency and variability problems like their younger renewable siblings (wind and solar), there are still several issues preventing them from being a long-term baseload. Cost estimates for building new ones have skyrocketed, making them cost-prohibitive. They suffer from seasonal and other cyclical drought issues, and there is little to no available damable land left. According to Greg Stark, the Hydropower Technical Lead at the National Renewable Energy Laboratory (NREL), no new hydropower plants are slated for the US for the foreseeable future. As he explains on ASME TechCast, most potential multi-purpose dam sites have already been developed, and significant resistance (public, political, and regulatory) exists against additional damming.

While wave energy pilot programs are showing promise for niche applications, like wind and solar, Wave Energy Converters (WEC) suffer from spatial and temporal scales intermittency and variability. Waves are not constant or consistent due to the changing and erratic weather patterns that affect them. One study of six different WEC systems (Wave Drago, Pontoon Power Converter, Sea Power, Ocean Energy buoy, Wave Star, & Archimedes Waveswing) across four deployment locations (Iceland Azores, Islands Madeira, Archipelag, Canary Islands) saw an average Capacity Factor (Cf) of only 14.76% over a single high wave energy winter season.[7] WECs Cf is well below all other electricity energy sources (see FIG. 6 for comparison)[8].

[7] L. Rusu and F. Onea, "The performance of some state-of-the-art wave energy converters in locations with the worldwide highest wave power," Renewable & Sustainable Energy Reviews, vol. 75, pp. 1348-1362, August 2017, doi: 10.1016/j.rser.2016.11.123.

[8] "What is Generation Capacity?," *Energy.gov.* https://www.energy.gov/ne/articles/what-generation-capacity While the dam and WEC hydro power plants are out, hydro remains one of our best hopes. Being that 87.5% of the world's population lives within a median distance of 3 km from free-flowing rivers, and over one-third of the total human population lives within 100 km (60 miles) of an oceanic coast[9], rivers, tides, and ocean streams with their naturally occurring energy-rich sub-surface currents are a highly underutilized source of electricity generation. The list of possible ideal locations for submerged hydrokinetic turbines is vast. Example Rivers (Theoretical global riverine resource est. at 58,000 TWh/yr)[10]: Mid/Lower Mississippi River, Nile Africa, the Amazon in South America, Chang Jiang in China, and Danube in Europe; Tidal (Potential global tidal power resources of 800 TWh/yr)[11]: Saltstraumen strait Norway, Bay of Fundy in Canada, King Sound in Australia, Gulf of Khambhat in India, Rio Gallegos in Argentina; Deep Ocean: Kuroshio Japan, Gulf Stream US Atlantic, Agulhas east coast of Africa.

[9] "Ocean Physics at NASA—NASA Science." https://science.nasa.gov/earth-science/oceanography/living-ocean

[10] M. Ridgill, S. P. Neill, M. Lewis, P. Robins, and S. Patil, "Global riverine theoretical hydrokinetic resource assessment," *Renewable Energy*, vol. 174, pp. 654-665, August 2021, doi: 10.1016/j.renene.2021.04.109.

[11] D. Johnson and H. Magazine, "Tidal Power Faces a Fickle Future with Rising Seas," *Scientific American*, Feb. 20, 2024. https://www.scientificamerican.com/article/tidal-power-faces-a-fickle-future-with-rising-seas If societies, governments, and businesses around the world aim to replace hydrocarbon electricity generation as the primary baseload source, they will need sources with comparable Capacity Factors (Cf) and relatively stable and predictable generation patterns. Japan's IHI prototype tested in the Kuroshio ocean current has a Cf of ~70%.[12]

[12] "Bloomberg—Are you a robot?," May 30, 2022. https://www.bloomberg.com/news/features/2022-05-30/japan-s-deep-ocean-turbine-trial-offers-hope-of-phasing-out-fossil-fuels Being that water is ~800 times denser than air, every cubic meter of water passing through the turbine's hydrofoils has 800 times more energy potential than a cubic meter of air. This allows for generating a significant amount of power with slower fluid flow and less volume than wind turbines need to make an equivalent amount of electricity. In fact, for a standard three-blade horizontal turbine comparison, "water moving at 2.5 m/s (5 knots) exerts about the same amount of force as a constant 350 km/h wind".[13]

[13] Tidal current turbine (andritz.com)

To unobtrusively harness the massive amounts of kinetic energy found in large rivers with constant 24/7/365 flow, strong tidal regions with consistent and accurate forecastability, and unwaveringly strong ocean currents, a fully-submersible in-stream turbine generator design that can be strategically placed (distributed) in suitable areas is needed in order to generate dependable (high Cf) renewable baseload and peak load electricity.

Today's hydrokinetic industry baseline turbine is the conventional three-blade horizontal-axis turbine (HAT) (US20040070210A1). While these perpendicular-to-the-stream, two-dimensional rotating plane actuators are industry-standard axial-flow turbines, their maximum Power Coefficient (Cp) is hindered by well-established conventional HAT limitations described by Betz's Limit; setting the maximum power that can be extracted from the water in open flow, independent of the design of a turbine, based on conservation of mass and momentum of the stream flowing through an idealized "actuator disk" at 59.3% of the kinetic energy. There is strong evidence that through the introduction and optimization of hydrodynamics features discussed in this document, along with re-allocating the costly parasite mass of the vertical support pylon/tripod to flow-optimizing embodiments, a significant increase in Cp can be achieved over traditional horizontal axis turbines (HATs) with little to no negative impact on per unit CapEx.

The most notable shortcomings of traditional horizontal-axis hydrokinetic turbines (HAHkT) are the startup high-stream velocities, efficiency-reducing flow leakage, and blade tip vortices that are noise-producing and efficiency-hindering cavitation, Cp limiting post-blade extraction flow stagnation, farm density affecting wake flows, risks associated with tip strikes and blade incursions, their need for a hefty vertical support pylon, and deployment complexity and costs. All these shortcomings extend beyond efficiency and direct economics, ultimately reducing the overall value proposition.

SUMMARY OF THE INVENTION

The invention, or device, as presented in this patent and all variations of the presented invention, will be referred to for the nonexclusive purpose of this patent as the Horizontally-Oriented Conical-Helical Hydrokinetic Turbine (HoChHT). This HoChHT invention term aims to define and distinguish the presented novel baseload-capable natural and man-made water stream-harnessing turbine system.

The HoChHT represents most of the primary functions, features, embodiments, solutions, and operations of the invention. The novelty of this invention lies in its use of a completely new turbine shape and form factor, which in turn introduces new and unique operating principles.

This novel design with a three-stage system passively amplifies, augments, and conditions internal and external flows to achieve superior performance.

Stage One: Stage One's 101 upstream inlet funnel collector and concentrator apparatus continuously engulfs large volumes of flowing water 109 and amplifies the internal stream velocity 117.

a) Preventing horizontal stream flow expansion and escape flow leakage while improving upstream static pressure conditions.

b) Taking advantage of the exponential effect of velocity on working forces, the amplified thrust produced by Stage One's increased volumetric flow rate is propelled through the Turbine.

c) Diffuses the flow around the Turbine, ideally increasing the mass flow passing through the rotor due to pressure reduction behind the Turbine, therefore increasing the available power.

Stage Two: Stage Two's 102 funnel allows for the higher velocity, lower pressure internal stream of water being jetted out from Stage One to draw/suck in the higher pressure of the ambient external stream 106 traveling over Stage One's exterior surface(s) into Stage Two's 102 flow conditioning ring inlet to join the internal stream before flowing into the turbine cone. This Entrainment 107 process is designed to increase the total Volumetric flow rate of water forced into Stage Three without increasing the diameter of the system.

Stage Three (turbine system): A three-axis aspect-ratio helical cone-shaped Turbine system 103 improves upstream and downstream separation. The system can achieve an enhanced axial-induction factor with its three-dimensional plane of rotation, which eliminates the conventional HATs' (US20040070210A1) single, uniform swept wall of impending resistance separating upstream from downstream. This conical separation plane progressively siphons off portions of the continuous kinetic stream along each section of the rotating helical blades down the constricting conical area until forced out the tail blade sections by the tail pod 104.

Stage Two's external surface profile facilitates the enveloping external stream 106 to continuously flow sweeping 108 over the trailing edges of Stage Three's turbine blades. By continuously feeding flow sweeping 108 water at an acute angle/parallel to the hydrofoils' trailing edges, this process produces a boundary of intersecting flows to mitigate exit flow stagnation over the length of the turbine's conical helical blades. This process of utilizing the exterior flow to sweep away repetitive blade turbulence, vortices, and stagnation zones is termed in this document as "Flow Sweeping." Flow Sweeping utilizes external kinetic energy to flow sweeping 108 away pressure build-up behind the power extraction areas of the HoChHT, thereby decreasing hydrofoil drag forces caused by flow separation and allowing for an even slower exit velocity (greater extraction) before induced blade stall. The HoChHT design has the potential to achieve increased maximum energy conversion by creating post-blade conditions that facilitate enhanced, all-factorial lift-producing blade designs.

BRIEF DESCRIPTION OF THE DRAWINGS

Having thus described the invention in general terms, reference will now be made to the accompanying drawings, which are not necessarily drawn to scale or proportion. The components used in the figures do not necessarily represent any actual brand, make, or model used in any particular HoChHT model or variation, and the component locations are not specific to any particular HoChHT model or variation. The primary functions that each component within the HoChHT performs should remain the same throughout most HoChHT models, variations, and design iterations.

Figure 1:
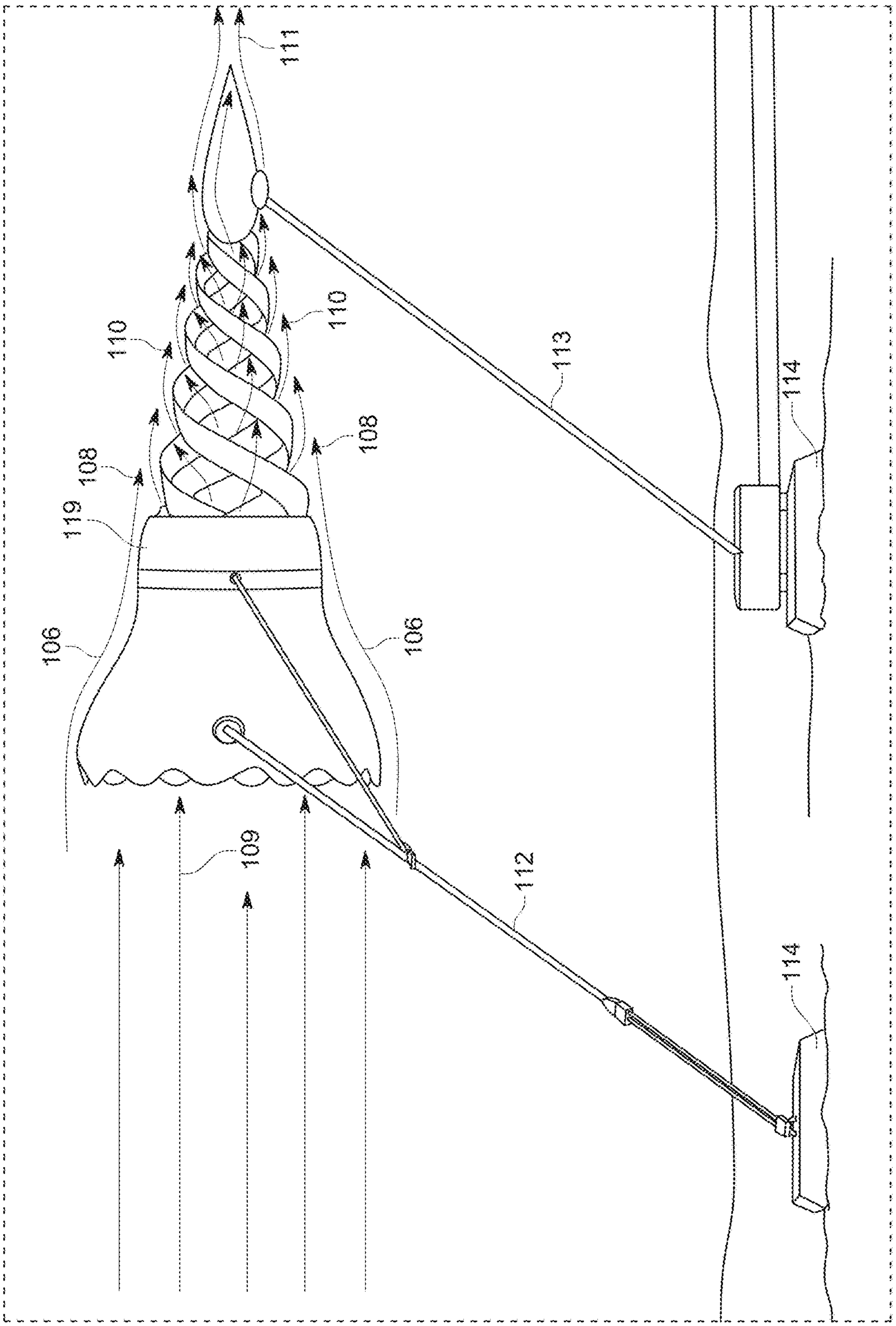

FIG. 1 is a perspective exterior side view of the HoChHT, fully submerged in the water stream at a depth established by buoyancy and a river-, sea-, and ocean-bed anchoring/mooring system 112, 113, 114.

Figure 2:
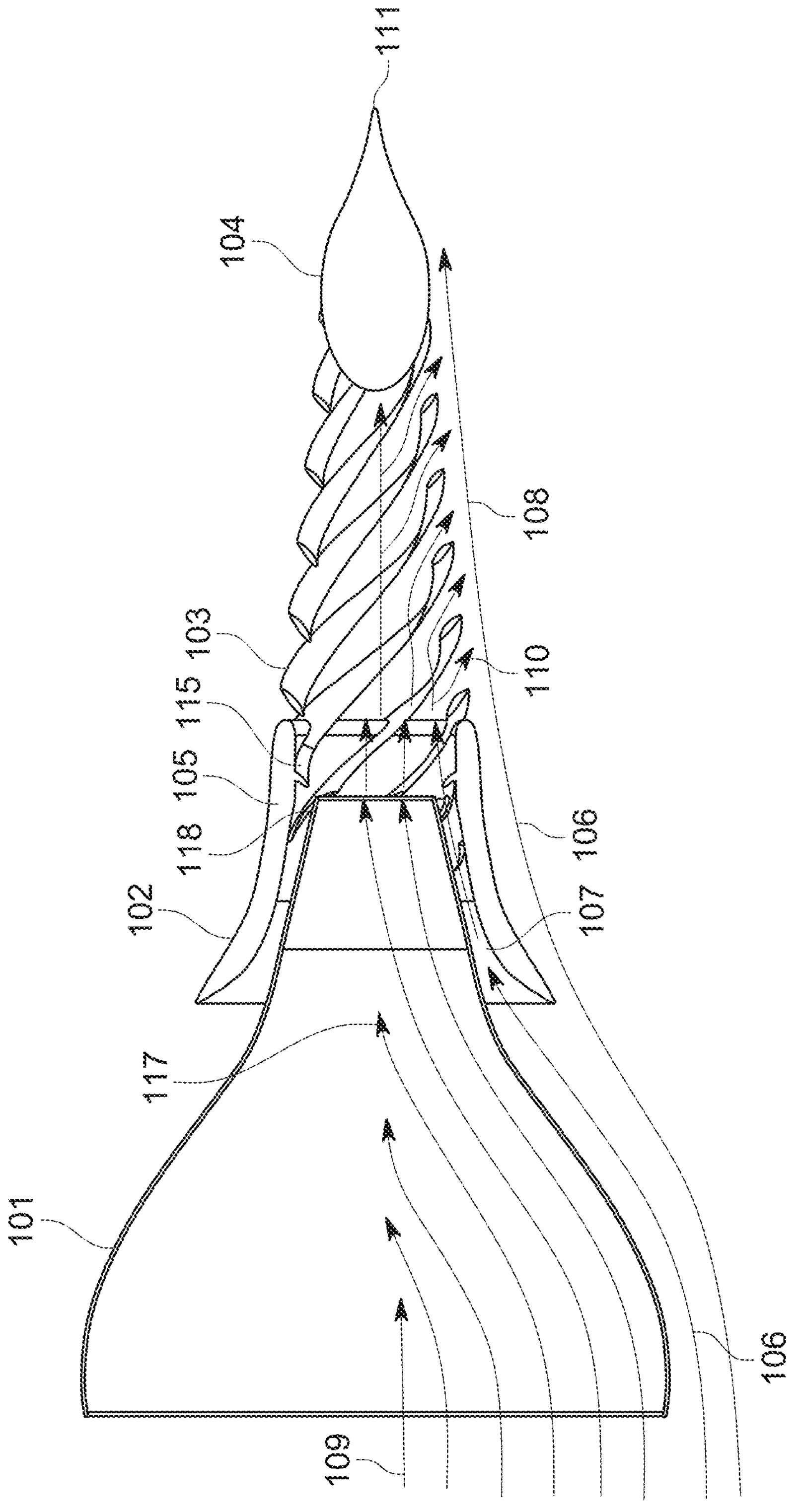

FIG. 2 is a cross-section side view of the three Stages of the HoChHT, showing the bottom half of the internal flow patterns as the water stream enters each Stage/Section, flows through each Stage/Section, and finally flows out of the turbine blade system by flowing through the blades/hydrofoils as exhaust flow 110 to rejoin the external stream; as well as the external water flow patterns around the exterior of each Stage/Section.

DETAILED DESCRIPTION OF THE INVENTION

The invention will now be described more fully hereinafter through reference to various embodiments. These embodiments are provided so that this disclosure will be thorough and complete, and will convey the scope of the invention to those skilled in the art. Indeed, the invention may be embodied in many different forms and should not be construed as limited to the embodiments set forth herein; rather, these embodiments are provided so that this disclosure will satisfy applicable legal requirements.

The invention will now be described more fully hereinafter through reference to various embodiments. These embodiments are provided so that this disclosure is thorough and complete and conveys the scope of the invention to those skilled in the art. Indeed, the invention may be embodied in many different forms and should not be construed as limited to the embodiments set forth herein; rather, these embodiments are provided so that this disclosure satisfies applicable legal requirements.

As used in the specification and in the appended claims:

a) The HoChHT may also be referred to as "the invention", "the system", "the device", or "the turbine."

b) The singular forms "a", "an", and "the", include plural referents ("one or more") unless the context clearly dictates otherwise; "Such "one or more" meanings are most especially intended when references are made in conjunction with open-ended words such as "having," "comprising" or "including."

c) The use of "and" and "or" does not explicitly mean in addition to or alternatively, but is implied to include both the additive and alternative forms of the term implemented in the text to enhance the readability of the document.

d) The use of "at least" and "one or more" implies that it is not limited to a singular.

e) The use of "to", "on", "in" or "through" a component or embodiment of the system implies the substitution of these prepositions. For example, "to" may also cover a "through" application.

f) "Via" encompasses on and through something, by means of, using, and utilizing.

g) A "hydrokinetic turbine" is a fully submerged device, whereas this device is an assembly of the majority of the structural, mechanical, and hydrokinetic to mechanical energy conversion components, that converts the kinetic energy of a water stream into rotational mechanical energy, following similar principles to wind turbines extracting energy from the wind.

h) "Turbine blades", "hydrofoil blades", "the blades", "hydrofoils", and "blades" are all terms that can be used interchangeably to specify/designate the individual turbine blades, turbine blade sections, or the collective arrangement ("plurality) of blades that makeup the HoChHT's "turbine blade system".

i) "Cone", "conical", "frustum", "funnel", and any derivatives or synonyms of them can be used interchangeably when describing the shape or form or the plane of the turbine system, Stage One, or Stage Two. Examples include cone-shaped, funnel-shaped, etc.

j) A "stream collector" is a cone-, funnel-, frustum-shaped device or component that features an inlet which captures a prevailing external stream and accelerates and pipes this captured stream into at least one downstream HoChHT Stage, Section, or Component.

k) "The length" of the blades is the longitudinal direction in which the blade profile travels down the conical plane. With one end of the blades upstream from the opposing downstream end of the blades.

l) Blade "Twist" is formed when a turbine blade has different angles of attack (AoA) down its longitudinal axis, or length segment(s). This change in AoA is usually progressive or regressive as traced down the length of the turbine blade.

m) The HoChHT "plane" is the three-dimensional path through which the acute angled turbine blade system travels as it rotates around the center horizontal axis of rotation, tracing the imaginary cone-shaped plane on which the turbine blades rotate 360-degrees, to complete each full rotation cycle.

n) Helical blades, or conical spiral, are helix blade arrangements where the turbine blades' longitudinal direction (running lengthwise), or length segment(s), curve/bend around "the conical" plane, creating a helical distribution where each blade is distributed around a section of the plane.

o) "Foil" describes the shape of the blade cross-section at given points along the length of the blade.

p) A "frustum" or "truncated cone" of a cone is the bottom portion of a cone that remains after cutting across the parallel to its base, essentially removing the smaller diameter cone top from the original cone, leaving behind a section with two circular bases (top and bottom, or front and back) of different diameters.

q) A "hollow frustum" is where the frustum has an open "inner cavity area" that forms an interior area within the frustum walls. The walls of a hollow frustum can consist of turbine blades or hydrofoil structures with sufficient gaps between them to let water flow from the inside of the frustum to the outside of the turbine. Hollow frustums can be open-ended, where both ends are open, forming a tube-like truncated structure (a.k.a conical shell); or closed-ended, where the wider inlet end is open and the narrow tail end turbine blades sections terminate into a tail pod or tail structure.

r) A "hollow cone" is where a cone-shaped turbine blade system terminates at the downstream tail section with all blades converging at an apex or vertex.

s) The "power extraction area" or "power extraction region" of a turbine refers to the swept area of the turbine blade system through which it captures energy from flowing water.

t) Progressive cone-shaped separation half-plane, is a progressively narrowing turbine blade system that separates the interior from the exterior of Stage One's cone-shapped turbine, where the half-plane boundary is the inner power extraction region down the length of the turbine blades, in which the kinetic-rich internal stream must pass through the gaps between the lift generating hydrfoil blades to extract the internal stream's kinetic energy as it exits the turbine and joins the external stream.

u) Flow-directing fins or vanes are structural elements designed to control the direction of water flow, thereby enhancing turbine system performance. These typically consist of stationary fins (a.k.a. guide or stator vanes), and for this application, they can be used to direct flow in a circular pattern to improve hydrokinetic conditions and/or at an optimized angle into rotating blades. There are several variants of these fins or vanes, including flow-redirecting straight fins or flat vanes, curved or airfoil-shaped vanes, which can offer the benefits of reduced flow resistance and improved directional control, and swirl vanes (or swirlers), which are efficient at imparting rotational motion to the water.

v) Bernoulli's principle states that as an incompressible fluid (such as water) moves through a constricted area or a narrowed section (like a funnel or a hollow frustum), its velocity must increase to conserve the flow rate.

w) The Venturi effect is the reduction in water pressure that occurs when a flowing stream of water speeds up as it transitions from a larger section to a smaller section of a pipe, cone, funnel, or frustum.

x) "Flow Entrainment" is the process where flowing water pulls in additional water into its flow due to pressure differences created by the Venturi effect. Essentially, the faster-moving water creates a lower pressure zone, causing external water to move towards that lower pressure and get swept along. By producing a higher velocity and lower-pressure internal stream, the system can utilize this to draw in higher-pressure external water through a secondary inlet via the suction created by a differential pressure (resulting from the lower pressure of the internal stream and the higher pressure of the external water).

y) "Dynamic pressure" is the pressure associated with the motion of the water as it applies forces equally around the cylindrical inner circumference surfaces of a conical-, frustum-, or funnel-shaped turbine system. The dynamic pressure acts radially outward, producing radial forces that push outward in all directions (360°) from the centerline. Wherein, through the turbine system's shape or form, the greater internal to external differential pressure causes the turbine to passively seek hydrostatic equilibrium and stability via directional or angular self-orienting pitch, roll, or yaw. Aiding in this, the dynamic pressure of the stream also applies axial forces pushing the turbine system in the direction of the flow, putting tension on its securing system in the direction of the stream flow. This tension helps resist any unwanted changes in the turbine system orientation.

z) Centrifugal force flow profile in water is the effect that occurs when the water flows along a curved or rotating path, wherein this water pushes outward away from the center of the curve (center axis). For our application, this flow behavior can be described as a rotating stream traveling at an acute angle around the center axis, creating a conical corkscrew-like flow that travels through the inside of the turbine. The outward force caused by this flow can create pressure gradients with higher pressure near the walls compared to near the center axis. These pressure gradients drive flow acceleration and reshape the velocity profile of the water. Explained by the principles of conservation of energy (Bernoulli's principle), when the pressure energy decreases due to the outward centrifugal effect, some of that pressure energy can be converted into kinetic energy, resulting in the water speeding up. The faster the water spins around the center axis, the greater the Tangential velocity. Inside a narrowing conical-, frustum-, or funnel-shaped tube, tangential velocity increases as it moves down the narrowing tube. The greater the tangential velocity when the internal stream interacts with the turbine blade system's power extraction area, the greater the potential power extraction of the turbine.

aa) The "Capacity Factor" (Cf) is a measure of how effectively a power plant or energy-generating system can generate power over a specific period of time, compared to its maximum possible output or rated output. This ratio is represented by the average power output over a specific period of time divided by its theoretical maximum power output if it were to run continuously at full capacity. This factor is crucial for evaluating the dependability and reliability of a power plant or energy-generating system, as it accounts for the intermittency, variability, and downtime associated with these systems and their sources of energy (wind, solar, fossil fuels, nuclear, geothermal, water waves, water streams, etc.).

bb) "Stage One" is an internal flow and/or external flow conditioning device/apparatus that precedes (upstream) the hydrokinetic turbine Stage to create desired hydrodynamic conditions/water flow profile(s).

cc) "Stage Two" is an internal flow and/or external flow conditioning device/apparatus that succeeds (downstream) Stage One and precedes (upstream) the hydrokinetic turbine Stage to create desired hydrodynamic conditions/water flow profile(s).

dd) "Stream" and "current" are continuous, directional movements (flows) of water found in inland rivers and streams, coastal tidal areas, and large moving bodies of water such as oceans and seas.

ee) In relation to the sections, sub-sections, regions, components, and Stages of the HoChHT, their relative positions can be referenced by relationship to eachother as their position within the flow path of the water, as such, upstream precedes downstream along the center axis longitudinal path and downstream succeeds upstream and downstream along the center axis longitudinal path.

ff) The "Volumetric flow rate" of water is defined as the volume of water that passes through a given cross-sectional area per unit time. The greater the velocity of the water flowing through a fixed internal area of HoChHT Stages/Sections, the greater the volumetric flow rate. A great volumetric flow rate equates to greater kinetic power. Power=(½)*(mass flow rate)*(velocity)^2, where mass flow rate is calculated as volumetric flow rate multiplied by density.

gg) Sections of the Stages: The "inlet section" starts at the stage's inlet upstream rim, or when connected to other components or stages, its furthest upstream attachment, connection point, or boundary/transition/interface line, and can extend along the length of the stage to the center point of the stage. The "outlet section" can start as far upstream as the center point of the stage and extends down the length of the stage to the stage's downstream outlet rim, or when connected to other components or stages, its furthest downstream attachment, connection point, or boundary/transition/interface line. The "middle section" is any portion of the stage that lies between the inlet section and the outlet section. These sections can vary from one HoChHT variant to another and from stage to stage.

hh) "Tail pod" or "tail structure" can be the furthest downstream major component or apparatus of the turbine system. An example of this is a conventional cylindrical torpedo- or teardrop-shaped outer nacelle with a stream-facing nose and a downstream wake-facing tail. It can house the generator, a gearbox, or other components. It can serve as an attachment point for mooring or tethering, a driveshaft, or electrical transmission components. It can be used as a connection point for the turbine blades. It can house ballast system components. It can offer hydrodynamic stability to the turbine system.

ii) Tethering, mooring, and anchoring can be used interchangeably or in combination to describe the process or system of securing a HoChHT to land, a fixed or moving object or structure, thereby holding the HoChHT in place.

jj) "Run-of-river" or "run-of-the-river" (RoR) hydroelectricity is a type of hydroelectric generation plant whereby little or no water storage (hydraulic head) is provided. Run-of-the-river power plants may have no water storage at all or a limited amount of storage. Unlike conventional hydroelectric power, where the energy source is hydraulic head created by a dam or diversion structure, a RoR power plant's energy source is hydrokinetic, derived from natural or man-made flowing streams.

kk) "Ballast tank" is a compartment, tank, or diaphragm attached to or within the structure of at least one of the Stages, including the turbine system and the tail structures, that holds a mass (fluid (liquid or gas), solid, or semi-solid), which is used as ballast to provide hydrostatic stability and/or control buoyancy.

ll) Center axis mean camber is where the inner (a.k.a inside or interior) surface of the funnel- or frustum-shaped section, stage, or device has an intentional curve or slope bias towards the HoChHT's center axis, away from its circular walls' cross-sectional cord line. Giving the foil-shaped cross-sectional profile of the funnel- or frustum-shaped section, stage, or device a more pronounced inner inwardly surface curve than its outer (a.k.a exterior) outwardly surface curve. This produces a velocity increase for the flow closest to the inwardly cambered surfaces. In doing so, this faster water flowing over the inner cambered surface will exert a force (via the pressure gradient) inwardly through the internal stream's velocity gradient to the slowest flow at the center axis, inducing an increase in the aggregate internal flow velocity.

mm) "Hydrostatic equilibrium" is when an underwater/submerged turbine within a stream and the forces acting on the turbine at different depths are perfectly balanced by the turbine's weight, resulting in the turbine having a stationary tendency within the fluid stream, essentially "floating" at a specific depth without moving up or down; this equilibrium occurs when the upward buoyant force exerted by the fluid precisely counteracts the downward gravitational force on the turbine. Hydrostatic equilibrium can also have a stabilizing effect on the turbine's horizontal pitch, longitudinal roll, or vertical yaw.

nn) "Spatial stability" is the underwater/submerged turbine's ability to maintain its desired attitude (horizontal, longitudinal, or vertical) to the stream and position in its three-dimensional space when disturbed by external forces, essentially meaning it can recover from disruptions in pitch, roll, and yaw, signifying a combination of both longitudinal and lateral-directional stability.

oo) "Hydrostatic stability" is the inherent tendency of an underwater/submerged turbine to return to a level position when disturbed and can be achieved by placing its center of gravity below its center of buoyancy, essentially acting like a pendulum effect underwater, ensuring passive stability in pitch and roll motions, the higher the difference between these centers (known as metacentric height), the greater the hydrostatic stability of the hydrokinetic turbine.

pp) Bypass flow occurs when the water stream, as it approaches the turbine's swept area, expands and flows around the outside of the turbine blade's swept area, rather than through the turbine blade system, thus not contributing to power generation. This uncaptured flow represents lost energy potential that all HATs experience to varying degrees.

qq) "Flow Sweeping" is the use of the external (i.e. doesn't pass through the turbine) stream's kinetic energy, which can flow parallel to a turbine's rotation plane and flow perpendicular or at an acute angle to the turbine blades AoA, to sweep away pressure build-up behind the power extraction areas of the Turbine. By having an external stream that flows at an optimized angle directly behind the turbine's hydrofoil blades' trailing edges, the process can sweep away high-pressure stagnated and/or turbulent flows into the wake. In doing so, this can increase the power extraction area pressure differential (in front/behind) and/or decrease the drag forces caused by flow separation, allowing for an even slower exit velocity (greater energy extraction) without inducing blade stall.

rr) "Tubercles" are biomimicry undulations on the leading edge of hydrofoil blades that are inspired by the surface bumps on the humpback whale's pectoral flipper. Tubercles may help direct water flow structuring by tuning the flow lines and generating streamwise counter-rotating vortex pairs that interact with the main flow, disrupting the coherent trailing edge wake structure, which can increase lift and reduce noise in the post-stall regime.

ss) Biofouling is the accumulation of unwanted microorganisms, plants, algae, or small animals on submerged surfaces. This accumulation can degrade the performance of structures, such as turbine blades, by increasing their drag and reducing their lift.

tt) "Sharkskin" is a biomimicry material or surface coating that prevents biofouling and, when oriented correctly relative to the water flow, can reduce hydrodynamic (surface) drag. It achieves these unique features with small protrusions just micrometers high, which replicate the scaly skin of shark skin, characterized by tiny V-shaped riblets called dermal denticles (microscopic ridges and grooves). These dermal denticle structures make it difficult for bacteria and other aquatic organisms, such as algae and barnacles, to settle and colonize on the surface, essentially, the surface topography disrupts their ability to adhere properly, effectively repelling them. Additionally, these dermal denticle microchannels can channel water flow, minimizing turbulence and creating a smoother surface flow profile, thus reducing drag.

uu) Turbine blade hydrofoil strakes, or chines, are small hydrodynamic fin devices located on over- or under-surfaces installed on or near the blade trailing edge. They can modify the water flow regime to help energize the flow over the succeeding helical-conical turbine blade's positive camber side. This arrangement can prevent flow separation and improve the overall hydrodynamic performance of the succeeding helical-conical blade/hydrofoil section that interacts with this modified flow. By directing the flow coming off the turbine blade and generating vortex wakes, strakes can energize boundary layer flows for succeeding helical-conical blades' sections. This wake interaction improves lift and reduces drag, leading to improved hydrofoil efficiency, increased lift, and greater torque; thus, improved Cp.

vv) "Tip leakage flow" refers to the phenomenon where water leaks out from the gap between the tip of a turbine blade, creating a secondary flow that reduces the turbine's overall efficiency; this is commonly called and is a significant concern in turbine design, as it can significantly decrease power output by disrupting the optimal water flow around the blades.

ww) Lift-to-Drag ratio (L/D) is the ratio of lift generated by a hydrodynamic body (like a hydrofoil) to the drag it experiences. It essentially measures how efficiently the body generates lift compared to the resistance it encounters. A higher L/D ratio indicates better hydrodynamic efficiency, meaning more lift is produced for a given amount of drag.

xx) A riverbed, lakebed, seabed, or oceanbed is where the water and land beneath the water intersect; also known as the floor or the bottom.

yy) "Electric generator" or "generator" is a device that converts motion-based power, such as rotational torque, into electric power (electrical current) using the principles of the electromagnetic effect for use in an internal or external circuit.

zz) Direct current (DC) is one-directional flow of electric charge.

aaa) Alternating current (AC) is an electric current that periodically reverses direction and changes its magnitude continuously with time bbb) Single-phase generator uses one AC phase (waveform) to produce electricity.

ccc) Multi-phase generator. A multi-phase generator is a type of electrical generator that produces AC electricity in more than one phase (waveform). It typically uses three or more phases, each of which is offset in time from the others, resulting in a more continuous and stable power supply.

ddd) A brushed generator uses brushes to transfer electrical current between the rotating part (rotor) and the stationary part (stator) of the generator.

eee) A brushless generator, on the other hand, uses two sets of rotors to generate and transfer the electrical current, eliminating the need for brushes.

fff) "Rim-driven" or "hubless" generator is a type of electric generator that integrates the generator into the periphery of the blades. Instead of the rotor being attached to a central drive shaft (conventional generator), the rotor, along with the stator, is located towards the outer rim of the turbine system, and they are part of the outer ring section where one end of the turbine blades are attached. These are typically direct-drive, meaning there is no gearing between the driving mechanism (turbine blade assembly) and the rotor. These generator systems are known for their no drive-train losses and simpler systems (fewer moving parts).

ggg) A "doubly-fed induction generator", or slip-ring generator, is an AC electrical generator in which both rotor and stator windings are fed with a three-phase AC supply. These two three-phase windings, one stationary and one rotating, are both separately connected to circuits outside the generator. One winding is directly connected to the output and produces 3-phase AC power at the desired grid frequency. The other winding (traditionally called the field, but here both windings can be outputs) is connected to 3-phase AC power at a variable frequency. This input power is adjusted in frequency and phase to compensate for changes in the turbine speed.

hhh) An "electrical connection", "electrical power interface", and "output connection" includes Alternating Current (AC), Direct Current (DC), bidirectional, and unidirectional; whereas an intentional mechanical connection is made that allows electricity to flow, be transmitted, via the connection.

iii) "Electrical wire", "electrical cable", and "electrical line" is one or more electrically conductive flexible/bendable fiber(s), strands(s), filament(s), or thread(s) designed to conduct and transmit electricity. As such, it encompasses cords, cables, conduits, and rods.

jjj) An "object detection system" is an electronic system that, at a minimum, monitors the surrounding environment for objects that can potentially damage the turbine or aquatic life that can potentially be harmed by the turbine. Beyond detecting, this system may also be able to classify and respond to objects or aquatic life in the water around the turbine. This can include active or passive environmental sensor systems such as Light Detection and Ranging (LiDAR), Sound Navigation and Ranging (SONAR), Underwater Hyperspectral Imaging (UHI), acoustic cameras, and optical cameras.

FIG. 1 illustrates how the turbine is aligned with the inlet open to the incoming stream flow 109, exterior stream 106 flow patterns, and internal flow exiting the turbine blade system by flowing through the blades/hydrofoils as exhaust flow 110 to rejoin the external stream with reduced wake 111.

FIG. 2 is a cross-section side view of the three Stages of the HoChHT, showing the bottom half of the internal flow patterns as the water stream enters each Stage/Section, flows through each Stage/Section, and finally flows out of the turbine blade system by flowing through the blades/hydrofoils as exhaust flow 110 to rejoin the external stream; as well as the external stream 106 water flow patterns around the exterior of each Stage/Section. Only the bottom half of the HoChHT's water flow patterns are depicted in order to leave the top half free of flow lines, offering a better view of the turbine components and stages/sections. The undepicted top half flow patterns are mirrored flows of the depicted bottom half flow pattern lines. The flow pattern lines are only a generalized reference visualization of flow directions and patterns as they consolidate and concentrate inside, and flow around the exterior of, the HoChHT stages/sections; followed by designed flow separation and divergence as the internal stream flows through the turbine blades to complete it HoChHT interaction by rejoining the external ambient stream with minimal post extraction disturbances (wake).

To achieve the greatest total submerged blade surface area with the smallest vertical footprint, the novelty of this invention begins with the use of a conical-shaped helical turbine, where the hydrofoil blades rotate around an axis aligned with the stream/current flow 109. By turning the blades on their side, this unique reaction axial flow turbine approach effectively utilizes the natural length of narrow or relatively shallow rivers and tidal areas, addressing some of the inefficiencies of the long vertical blade setup found in traditional HATs. While some of the same fluid mechanics, fluid dynamics, and hydrodynamic principles of more conventional designs still apply, due to the introduction of new principles in this space, it's postulated that this HoChHT turbine design is not limited by the current theoretical maximum power coefficient. The different principles presented, working in conjunction, should circumvent current HAT limitations and achieve superior performance.

Since the proposed turbine blade design is a helical cone shape with a three-axis aspect ratio (FIG. 1) oriented at an acute angle(s), not a two-dimensional rotating actuator disk perpendicular to the stream, there is no single uniform wall of impending resistance separating upstream from downstream. Instead, an improved upstream and downstream separation is achieved with a large surface area helical cone rotor, resulting in an enhanced axial-induction factor. This also leads to the potential for implementing a higher solidity ratio compared to traditional horizontal-axis turbines, thereby providing even greater energy conversion, torque, and Cp.

Stage One 101, the upstream mouth of the turbine's concentrator apparatus horn/funnel, continuously engulfs large volumes of flowing water 109 while inhibiting horizontal stream flow expansion and preventing escape flow leakage. The large circumference leading edge is optimized for laminar flow split (interior and exterior) to prevent unwanted turbulence and vortices. As the water stream enters the diffused inlet, it accelerates internal stream velocity 117 as it travels through the shrinking internal diameter channel of this horn/funnel. This increased water velocity reduces fluid pressure as it exits this first stage.

While the HoChHT is not a ducted or shrouded turbine, such as diffuser-augmented tidal turbines (DATTs) where the blade circumference (blade sweep path) is surrounded by/confined within a housing with little to know gap between blade tips and the surface of the housing (U.S. Pat. No. 8,633,609B2, U.S. Ser. No. 11/879,424B2, US20050285407A1, US20130043685A1, and U.S. Pat. No. 6,806,586B2), it still can take advantage of flow diffusion by drawing in more water and increasing the internal water velocity as DATT designs are touted for, thus increasing the HoChHT volumetric flow rate. While the HoChHT's utilization of this flow-enhancing technique is yet to be determined, a conventional DATT has demonstrated maximum power enhancement of 91% over benchmark performance[14],

[14] M. Shahsavarifard, E. Bibeau, and V. Chatoorgoon, "Effect of shroud HoChHT performance of horizontal axis hydrokinetic turbines," *Ocean Engineering*, vol. 96, pp. 215-225, MarHoChHT, doi: 10.1016/j.oceaneng.2014.12.006.

Stage One's higher velocity, lower pressure flow is jetted out of its downstream exit nozzle 118 directly into the turbine system 103 or into Stage Two 102 horn/funnel. Concurrently, the surrounding external stream 106 flow attaches to the outer surface of the Stage One 101 horn/funnel and travels over its entire surface area, and is used for turbine blade Flow Sweeping 108 or sucked into the Stage Two 102 horn/funnel.

Stage Two 102 horn/funnel allows for the higher velocity, lower pressure internal stream of water being jetted out from Stage One to draw/suck in the higher pressure of the ambient external stream 106/exterior flow traveling over Stage One's 101 exterior surface(s) into the turbine to join the Stage Two 102 internal stream. This Bernoulli's "Entrainment" 107 process is designed to increase the total Volumetric flow rate of water forced into Stage Three's turbine area.

In contrast to HoChHT's pre-turbine blade system flow entrainment 107, other hydrokinetic turbine designs (U.S. Pat. No. 3,986,787A, U.S. Ser. No. 11/879,424B2) use post-turbine blades' reverse entrainment to create a low-pressure area behind their HAT blades to improve turbine performance by creating a low-pressure area behind the turbine.

Much like the circumference leading edge(s) of Stage One's 101 horn/funnel, Stage Two's 102 inlet horn/funnel should be optimized for laminar flow split (interior and exterior flow) to prevent unwanted turbulence and vortices. The flow(s) through Stage Two's horn/funnel is conditioned by the Stage Two inlet gap distances and surface geometries for optimum flow velocity, direction, and relative flow angle to seamlessly combine with the internal flow. Flow conditioning fins or veins may be utilized to induce a rotational flow, facilitating a desirable vortex-like flow.

Similar to how the external surface shape of Stage One's 101 horn/funnel facilitates attached external flow that directs the external water stream into Stage Two's horn/funnel, Stage Two's 102 external surface profile facilitates the attached external flow of the external stream, directing it to continuously flow sweeping 108 over the trailing edges of Stage Three's turbine blades/foils. By continuously feeding ambient free-flowing water at an acute angle or parallel to the hydrofoils'/blades' trailing edges, this process is designed to produce a boundary of intersecting flows to mitigate external stagnation over the entire length of the conical profile turbine's helical hydrofoils/blades, from blade upstream roots 115 to where they terminate into the low drag tail pod 104. As previously described, this novel Flow Sweeping process utilizes the exterior flow to sweep away repetitive blade turbulence, vortices, and stagnation zones. In doing so, it utilizes uncaptured external kinetic energy to sweep away pressure buildup behind the power extraction area, thereby decreasing blade stall exit velocity limits. Thus increasing the turbine's potential maximum energy conversion.

To further explain the Flow Sweeping process and its benefits, for most open environment free-stream turbines, the mass flow remains constant throughout all points in the flow stream tube, which defines each turbine's flow characteristics. Mass must remain constant when only two openings are present (inlet and outlet). The tapered (conical) helical blade design and configuration of the turbine facilitates the additional external flow sweeping 108 water (which is near to or at ambient velocity and pressure) to surround and travel down the length of the external turbine rotor blades to improve efficiency by increasing the mass flow rate of the exhaust flow 110 exiting the turbine. This external water flow transfers its energy to the turbine exhaust flow 110 by combining with it near the conical turbine exit plane. This external flow utilization method increases the post-extraction velocity, increasing (sucking) the exhaust flow velocity with an increased differential pressure gradient, and in doing so, it mitigates the performance-reducing post-blade extraction stagnation, which is a well-established performance limiter for all conventional HATs.

In Stage Three (turbine system 103), as the decreasing inner diameter constricts internal flow, the high-velocity water being jetted in from Stage Two creates an internal pressure greater than the external pressure. This differential pressure, along with the kinetic energy of the internal flow, forces the water stream exhaust flow 110 to exit the turbine by traveling through Stage Three's horizontally rotating helical hydrofoil blades and out of the turbine to rejoin the external sweeping 108 current. This continuous process generates the rotational torque and RPM required to power an electrical generator, which, in this example, is located in a tail pod 104.

Due to stream shear, where vertical water-velocity profiles result in different stream speeds at the blades nearest to the ground level compared to those at the top of the blade, conventional HATs (US20040070210A1) tend to experience variable torque throughout their rotation cycle as the rotor disk travels. Since Stage Three's conical shape is oriented horizontally and in line with the flow, and the internal steam has been pre-conditioned (concentrated) the internal stream velocity 117 prior to interacting with blade system, the entire length of each helical hydrofoil is always the sum of the lift and drag forces on each blade without abrupt changes in rotation, thus, this turbine shape facilitates a much smoother torque curve with less blade stress variability as compared to conventional HATs.

Since the turbine blades begin as attached/integrated extensions of Stage Three's inlet rotating rim (hubless) 119 and terminate with a smooth transition onto/into the tail pod's 104 rotational section, there are no blade tips. As seen in toroidal boat propellers and low tip clearance/gap shrouded/ducted horizontal-axis turbines, closed-form hydrofoil blade structures negate spinning/rotating performance-hindering blade tip vortices and environmentally disturbing acoustic signatures.

Turbine blade strakes, or chines, can be used to enhance the performance of succeeding helical-conical turbine blade hydrofoils. These small hydrodynamic fin devices, when installed on the under-surfaces along specific segments near/on the trailing edge of each blade, can re-energize the water flow coming off that blade and direct it over the succeeding helical-conical turbine blade's upper camber side. By generating vortexes and directing them toward the upper surface of the blade sections traveling in the flow path behind, may prevent flow separation and improve the overall hydrodynamic performance of the succeeding helical-conical blade/hydrofoil section. This straked blade preceding flow augmentation can energize boundary layer flows for succeeding helical-conical blade sections, improving lift and reducing drag, leading to enhanced hydrofoil efficiency, increased lift, and greater torque; and thus improved Cp. Examples of these can be found on the upper exterior of aircraft jet engine nacelles, where they serve a similar preceding flow directing and vortex generating function for aircraft wings, enhancing lift and improving aerodynamic performance.

Any Stage of the HoChHT can have internal or external flow-directing fins/vanes that take input flow(s) and induce or facilitate rotational flow around the central axis as this conditioned flow progresses forward, creating a corkscrew-like spiraling flow within or around the outside of HoChHT Stages/Sections. Utilizing these fins/vanes to direct the flow into a unidirectional internal circular spiral as it travels through to the turbine can further accelerate the stream and set the stream trajectory to interact with the turbine blades at an optimized angle, thus increasing Cp. If the spiraling effect has a sufficiently high rotational velocity, the spiraling stream can increase the centrifugal force of the water enough to provide ample outward inertia, pushing the water out of the turbine blade system with greater force.

Flow path-altering internal or external fins/vanes can also be utilized to counteract the Torque Effect that the rotating turbine has on the non-rotating HoChHT Stages/Sections. The torque produced by the turbine's hydrofoil blade system rotates the turbine, which in turn rotates the generator. The non-rotating portions of the system must counteract this rotational torque by creating an equal and opposite reaction, ensuring that the non-rotating components, including the turbine, do not rotate around the same axis in the same direction as the turbine blades. The rotational pushing effect the stream will have on the fins/vanes and their Stages/Sections as the flow is forced to alter its direction, can oppose some of the rotating turbine Torque Effect.

One distinctive advantage that enhances the utility of this design lies in the fact that the system's largest diameter isn't the rotating turbine blades. Instead, a large-diameter Stage One 101 concentration horn/funnel serves as a static protective barrier against foreign object incursion. When combined with low operating speeds and complete system submersion (anchor/moored), it is hypothesized that this configuration significantly mitigates the risk of blade strikes that cut, catch, or clip objects, which causes turbine damage, ecosystem disturbance, injury to aquatic species, and interference with recreational and commercial aquatic traffic. This renders the turbine suitable not only for deep-water tidal and ocean currents but also for much shallower tidal areas and rivers without sacrificing performance.

In one securing/anchoring method, to ensure the turbine is unencumbering to recreational boaters and commercial ships, as well as safe for our vital river life and their delicate ecosystem, the fully submerged HoChHT with generator system is tethered/moored 112, 113 at appropriate depths to river, sea, or ocean bed anchors FIG. 2. The adjustable buoyancy and ballast of the system allow the system's buoyancy to be set to float above the underwater anchors 114 with minimal tethering or mooring line tension. With this approach, the HoChHT can maintain a much lighter anchoring system with minimal floorbed intrusion compared to conventional HAHkTs, which require large anchoring ballast blocks (U.S. Pat. No. 9,073,733B2) and/or a large buried foundation pillar(s) (US20040070210A1). Additionally, a buoyancy-tuned system with a net positive ballast provides just enough tension to maintain a secure connection without placing excessive stress on the tethering/mooring line(s) and the anchoring system, allowing for fewer tether lines and the use of minimal tensile strength lines. All of which further improve the economics and viability of the HoChHT.

In another securing or anchoring method, the turbine is suspended from or between water surface platforms, such as offshore wind turbines and oil rig platforms, or their moorings, via connected tethers or moorings. In this version, the ballast is tuned to hang from the platforms with a net negative ballast. This gives the system the unique capability of coexisting with both new and existing offshore infrastructure.

In both of the above-mentioned securing/anchoring methods and any other unmentioned methods, the electrical cable(s) used to transmit the generated electricity out of the HoChHT can be one or more of the morning tethers. By utilizing the same wires that transmit electricity from the HoChHT as structural components, the total amount of components and materials required for the installed system should be minimized, thereby reducing the system's total capital expenditure (CAPEX).

Additionally, the preliminary simulations indicate that this conical and helical turbine design can harness additional sources of energy inputs such as unsteady flow entering the inlet, as well as turbulence generated from the rotary motion at the root of blades and the additional lateral cross-flow, which may all add additional kinetic energy to the system.

The narrowing inner diameter of Stage Three's cone profile turbine places the leading edge of each helical blade section closer to the Turbine's centerline than the preceding blade section's leading edge. This can be seen in a cross-sectional FIG. 2. This ensures that each blade section's leading edge interacts with the internal stream flow without disturbing the upstream blade. This concentric spiral blade design gradually exhausts the available kinetic energy from the stream, siphoning off energy as the remaining flow proceeds down the cone and is directed through and out the tail pod, connected to the blade ends. This process can create consistent and proportional set lift along the entire span of each hydrofoil blade, improving overall kinetic capture and utilization.

Since the turbine upstream blade connects into/onto Stage Three's inlet rotational ring assembly, as established with a hydrodynamic smooth transition, and the blades extend down the length of the conical turbine profile to terminate with a smooth downstream transition into/onto the tail pod's rotational section, there are no blade tips. As seen in toroidal boat propellers and ducted/diffuser (DAWT) horizontal-axis turbines (US20130043685A1), closed-form blade structures negate performance-hindering blade tip vortices and reduce the aquatic disturbing acoustic signature.

Tubercles, the biomimicry undulations that can be applied to the leading edge of hydrofoil blades, can help direct water flow structuring by tuning the flow lines and generating streamwise counter-rotating vortex pairs that interact with the main flow. This interaction reduces the flow separation at the front of the blade pressure side, which can increase lift and reduce drag. So, not only can Tubercles reduce the acoustic signature of the HoChHT, but they can also increase the Lift-to-Drag ratio (L/D) of the hydrofoil. Furthermore, they can delay stalls, which can also allow for an increased optimum Angle of Attack (AoA). Tubercles have also been observed to prevent vapor bubbles from forming on foil/blade leading edges, thus mitigating Cavitation and its negative effects (surface pitting and deterioration, breaking up laminar flow, etc.). The counter-rotating vortices disrupt the coherent trailing edge wake structure, reducing noise in the post-stall regime.

Beyond the acoustic signature reduction achieved by the HoChHT's unique closed-form blade system, where both ends of the blades terminate into another system component, the counter-rotating vortices of leading-edge tubercles can be utilized to further mitigate acoustic noises that disturb aquatic life.

The combined HoChHT Stages, as a whole, and the synergetic processes occurring throughout allow for systematic designs of optimum combinations, which can achieve increased solidity ratios, higher angles of attack (AoA), higher lift-producing blade profiles, and greater volumetric flows compared to traditional HAHkTs and all other prior art. Thus providing greater energy conversion potential through novel design.

Beyond the distinctive performance advantages, additional utility is achieved through its compact size, both vertically and widthwise. HoChHT's largest diameter isn't the swept area of the rotating turbine blades. Instead, a larger diameter concentration funnel is a protective barrier against foreign object blade incursion. This, combined with low operating speeds and complete system submersion (anchor/moored), this configuration may significantly mitigate the risk of blade strikes that cut, catch, or clip objects and aquatic life. In doing so, this design reduces the risk of damage to the turbine blades, surface and sub-surface vessels, aquatic life, and the ecosystem.

Another aspect of the HoChHT is that it operates fully submerged, with no water surface-level components that can impede or be a hazard to recreational and commercial boat traffic. So, this turbine system is not only suitable for deep-water tidal and ocean currents, but it can also operate safely in shallower tidal areas and rivers.

Unlike MeyGen tidal energy HAHkT turbines (based on US20040070210A1 and U.S. Pat. No. 9,073,733B2), with their 18-meter swept area, the HoChHT may use internal air and water ballast tanks to achieve buoyancy neutrality and stability at desired depths. This allows this design to forgo the giant 190-ton+ steel pylons and tripod systems for seafloor securing and stabilization. By not requiring a rigid vertical support system, this turbine system can reduce the total required support material and mass by more than 66% and re-allocate the hefty non-generating, flow-disturbing, and parasitic-drag structural materials (190 tons of steel) to flow optimization components such as the Stage One and Stage Two structures. Therefore, while the HoChHT design may require more material for flow collection and conditioning, there is potential for a net reduction in total material (mass) used throughout the entire system compared to conventional HAHkTs.

The ballast tanks can be integrated between the inner and outer surfaces of Stages One and Two, as well as additional tanks located inside the blades and tail pod to ensure the ballast system(s) do not increase drag and provide better hydrodynamic stability. Like airplane wing tanks, ballast tanks can be sandwiched between two functional surfaces in Stages One and Two. To aid in stability, the bottom ballast tanks can be filled with ballast (i.e., water) first, and then, sequential tanks will be filled until the desired turbine depth is achieved. This is similar to how naval submarines achieve some of their depth-tuned buoyancy and pitch and roll stability. Giving the HoChHT a relatively stable metacentric height (GM).

Additional stability and roll resistance can be achieved by increasing the air pressure in the top tanks, creating a greater upright tendency that counteracts some of the translational rotation torque of the Turbine. This strategy of low center of gravity (CG) combined with upper-cavity-contained air is utilized in self-righting/capsize-resistant boats and floating offshore platforms.

The HoChHT design uniquely achieves additional passive stability through its shape (symmetrical funnel- or cone-shaped interior or exterior predominant form) and how water flows through and around it to create equilibrium-facilitating distribution of dynamic pressure around the exterior or within the interior of the turbine. Additionally, much like rotating windsock kites, this system will exhibit a hydrodynamic tendency to remain in the prevailing stream current.

Thus, through its designed form and function, the HoChHT can have superior inherent stability, maintaining a natural balance between forces and its desired attitude within the free-flowing stream. This ability to maintain positive static stability, neutral static stability, or positive dynamic stability can give this turbine passive directional or angular self-orienting pitch, roll, or yaw under normal stream conditions. This is in contrast to traditional HAHkTs, which are inherently unstable with their strong roll, pitch, and yaw tendencies, thus the need for the previously described robust vertical support structures.

Since the HoChHT doesn't utilize vertical support pylon systems, these costly and complex structures are not a limiting factor for this turbine's maximum size. With traditional hydrokinetic HAT designs. Due to the density and viscosity of water, subsurface streams put a tremendous amount of horizontal drag forces through the turbine and down the tower's height. The larger the turbine diameter, the greater the height of the pylon required, the more mechanical stress and lateral loading on the pylon. There is a point at which turbine size becomes cost-prohibitive due to the complexity and mass of the pylon. While the HoChHT still has a drag factor to consider, since it lacks the vertical tower/pylon structure that limits conventional HAHkT turbine diameters, the HoChHT is less constrained by blade length limits and swept area size. With the potential for a much larger diameter per-unit design, the HoChHT can leverage the economies of scale that its above-water cousins, wind turbines, have been benefiting from at an ever-increasing swept area size.

Unlike other known tethered/moored HAHkTs, the HoChHT doesn't use lift and drag-producing wings to essentially fly underwater to maintain its vertical position (U.S. Pat. Nos. 2,501,696A, 4,383,182A, 6,531,788B2). These winged turbine systems require a substantial amount of additional material and mass to maintain the turbine at the optimal depth, and do not directly enhance the hydrodynamic efficiency or power output of the turbine system. The HoChHT, on the other hand, utilizes additional materials to form turbine performance-improving surfaces and structures that incorporate ballast tanks internally, positioned between the functional surfaces. Thus increasing the material-to-power production ratio over other designs.

Another potential benefit of this turbine's floating tethered-based deployment and installation method, without a large, heavy fixed bottom structure, the HoChHT may be fully constructed and assembled on land, launched into the water to self-float (ballast tanks filled with appropriate amount of air), and then float on its own accord for off-vessel towing out to its deployment site. By not needing a large transportation vessel to carry the turbine out to a deployment site, the HoChHT may achieve a significant reduction in deployment complexity, time, and costs.

Additionally, floating tethered-based deployment may enable easy retrieval and recovery of turbines by surface crews for maintenance, cleaning, and repairs, resulting in reduced O&M costs and improved LCOE. They can use a surface maintenance platform or vessel to retrieve the turbine by connecting a retrieval line(s) to it and reeling it to the surface; or connecting an air hose to it, and changing its ballast to make it more buoyant so it floats to the surface; or some other similar variant(s) or combination(s) of these.

By varying the length of the tether/mooring and the buoyancy of each HoChHT in an array (or farm), the floating tethered design allows for each turbine to be installed at strategically varying depths throughout an array (or farm). This allows for reduced wake interference between adjacent and downstream HoChHTs, enabling higher economically viable density array configurations within each HoChHT farm.

The Applicant has conceived of certain novel designs for renewable energy-generating in-stream hydrokinetic turbines and has furthermore drawn upon multiple concepts, tools, and information from a number of different fields, and has employed and/or combined them in a novel manner to design the HoChHT system, which exhibits a significant improvement for all stakeholders. The synergistic interaction of multiple components that comprise this novel HoChHT system has been strategically incorporated to ensure maximum energy generation with minimal costs and a reduced environmental impact. The "Novelty of Design Process" is evident in the attention to the design details incorporated in the presented invention, resulting in the first mass-deployable hydrokinetic in-stream turbine system. The HoChHT system features enables it to be employed in multiple flowing water environments and applications for which prior systems are inadequate.

The design of this HoChHT system and/or components is unique because no other design has utilized a funnel- or cone-shaped turbine blade system assembly up until the present. Nor have any other designs been proposed that utilize Venturi Entrainment, circular flow generation, or Flow Sweeping to increase efficacy and power output; or novelly combined in component selection, component design, and interaction of these components, together with transportation and installation processes to maximize the value proposition of the present invention. Although some of the individual elements are known, the effects of all the different elements used in this design, especially the mutually beneficial and synergistic effects of these elements combined, are new and inventive.

The invention claimed is:

1. A hydrokinetic turbine system, the system comprising:

a) a turbine blade system, wherein the turbine blade system includes a plurality of hydrofoil blades distributed around a three-dimensional conical plane;

b) wherein each of the hydrofoil blades include at least one blade length segment, at least one downstream blade section, at least one downstream blade tip, at least one profile, and at least one geometry;

c) wherein the hydrofoil blades are arranged lengthwise down a concentric frustum-shape at an acute angle to an axis of rotation;

d) a larger diameter inlet section, proportionally larger than a largest diameter of a plane of the turbine blade system, wherein the larger diameter inlet section is open to a water stream;

e) a center axis of rotation is generally aligned with a water stream flow's relative direction of travel; and f) an inner cavity area is formed by a progressive cone-shaped separation half-plane.

2. The system of claim 1, wherein the hydrofoil blades curve around the conical plane with a helical curve along the at least one blade length segment, forming a conical spiral or conical helix blade arrangement.

3. The system of claim 1, wherein:

a) the hydrofoil blade chord lengths, profiles, or geometries are nonuniform; or b) the hydrofoil blade chord lengths, profiles, or geometries are divided into unique segments along the length of the blades.

4. The system of claim 1, wherein:

a) the conical plane is shortened to form an open-ended frustum, wherein each of the downstream blade tips are free and unconnected at the furthest downstream termination points; or b) the conical plane is shortened to form a closed-ended frustum, wherein the at least one downstream blade section is operatively connected to a tail structure or tail pod.

5. The system of claim 1, further comprising: a downstream tail structure or tail pod.

6. The system of claim 1, further comprising:

a) a Stage One;

b) wherein the Stage One includes an upstream inlet stream collector;

c) wherein the Stage One includes an inlet section and an outlet section;

d) wherein the Stage One stream collector's upstream inlet includes a larger diameter opening than that of the system's larger diameter inlet section; and e) the Stage One is positioned in front of, or operatively connected to the front of, the system's larger diameter inlet section.

7. The system of claim 6, wherein the upstream inlet stream collector further comprises:

a) a Stage Two;

b) wherein the Stage Two includes an inlet section and an outlet section;

c) the inlet section of Stage Two is located downstream from the inlet section of Stage One;

d) the inlet section diameter of Stage Two is greater than the outlet section diameter of Stage One; and e) an inlet gap is located between an outer surface of Stage One's outlet section and an inner surface of Stage Two's inlet section, which forms a secondary inlet downstream from Stage One's inlet and upstream from the hydrokinetic turbine system.

8. The system of claim 1, further comprising:

a) a foil-shaped cross-sectional inlet section profile; and b) wherein the cross-sectional inlet section profile has a center axis mean camber.

9. The system of claim 1, further comprising: at least one ballast tank.

10. The system of claim 1, further comprising: an electric generator.

11. The system of claim 10, wherein the electric generator is located within the larger diameter inlet section or a tail pod apparatus.

12. The system of claim 1, further comprising:

a) an anchoring system operatively connected to a riverbed, lakebed, seabed, or oceanbed;

b) a mooring system operatively connected to at least one of: above-water land, a boat, or a floating water surface platform; and c) wherein the anchoring or mooring system tethers the system at a desired location or depth below a surface of the water.

13. The system of claim 1, further comprising: an object detection system.

14. The system of claim 1, further comprising: hydrofoil tubercles.

15. The system of claim 1, further comprising: a sharkskin surface treatment, surface coating, or surface wrap.

16. The system of claim 1, further comprising:

a) the large diameter inlet section having a center-axis mean camber form; and b) the center-axis mean camber form including cambered surfaces that define the predominant cross-sectional form of the large diameter inlet section.

17. The system of claim 1, further comprising:

a) one or more internal or external flow-directing fins or vanes configured to interact with an incoming fluid stream.

* * * * *